UNITED STATES PATENT OFFICE.

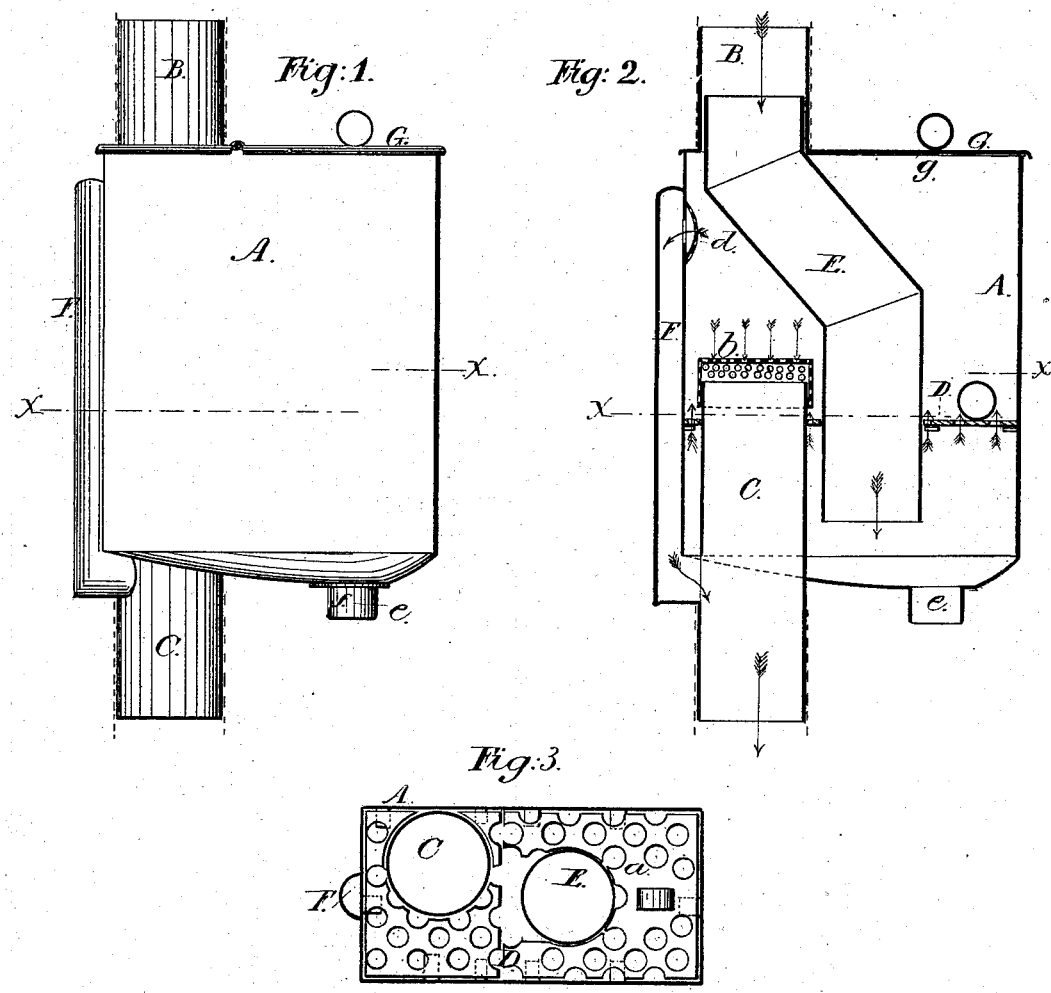

JULIUS BERGEMAN, OF WOODRIDGE, NEW JERSEY.

FILTER.

SPECIFICATION forming part of Letters Patent No. 237,469, dated February 8, 1881.

Application filed July 26, 1880. (No model.)

*To all whom it may concern:*

Be it known that I, JULIUS BERGEMAN, of Woodridge, in the county of Bergen and State of New Jersey, have invented a new and useful Filter for Liquids, of which the following is a specification.

My invention relates to improvements in filtering liquids, and the object thereof is to prevent foreign matter from passing into the liquid-receptacle, and also to prevent the filter from being choked or obstructed by the solid matter carried into the case.

My invention relates to improvements in the construction of filters; and it consists, first, in providing the inlet-pipe with a detachable branch pipe extending down through the filtering screen or material, so as to convey the liquid to the bottom of the case, and arranged so that when it is desired to clean the filter it can be quickly and easily detached and removed from the case, and thereby permit the filtering material or screen to be taken out and cleaned without difficulty; secondly, it consists in providing filters in which the inflowing water is conveyed to the bottom of the case, and the outflowing water is carried off from above the filtering material with an overflow-pipe connecting the upper chamber of the filter with the delivery-pipe, so that choking is prevented.

In the accompanying drawings, Figure 1 represents a side elevation of my improved filter. Fig. 2 represents a sectional side elevation of the same, showing the internal arrangement;
and Fig. 3 is a cross-section of the filter, taken on lines *x x* of Figs. 1 and 2.

Referring to the drawings, A represents the box or case, which may be of any suitable form and material. B represents the inlet-pipe, and C the outlet-pipe. At a convenient point within the case is placed a diaphragm shield or strainer, D, a portion, *a*, of which may be unsecured to its supports, so as to admit of easy removal, to give access to the part of the case below, for the purpose of cleaning out accumulations there, &c. The diaphragm shield or strainer should be provided with perforations or other openings sufficiently numerous to permit the water or other liquid to pass freely;
but it should be adapted to strain out of the water or other liquid all but the most minute particles of solid matter, and retain such matter below.

E represents the branch pipe, extending from the inner end of the inlet-pipe down through an opening in the diaphragm D, and terminating above the bottom of the case. The outlet-pipe extends above the diaphragm D, and may be provided with a filter, *b*, which may be simply a perforated plate or thimble placed over the end of the said pipe, or a filter adapted to thoroughly purify the water or other liquid passing through it; but the strainer or filter *b* may be omitted from the outlet-pipe, if desired, when, as may be the case, the diaphragm D is adapted to serve as a filter for the liquid.

F represents an overflow-pipe, extending from the upper part of the filter-case, where the entrance to it may be provided with any suitable strainer or filter *d*, to the outlet-pipe C, outside of the case, so as to carry off any excess of water in the case caused either by an excessive inflow or by the choking of the outlet-pipe within the case.

The bottom of the case A may be dished, and at its lower point provided with an escape or draw-off orifice or tube, *e*, which may be closed with a suitable cap, *f*, or a plug, if it may be preferred. By making the bottom of the case in the form shown, and providing it with the orifice or tube *e*, the cleaning of the filter of accumulations of sediment, &c., is greatly facilitated.

The filter-case may be provided with an opening, *g*, covered with a hinged or sliding lid or cover, G, to give admission to the interior of the case for cleaning or repairing the filter. The branch pipe and the removable part of the diaphragm are arranged to be taken from the case when necessary, and to be readily replaced within the same. In case the flow through the filter should be stopped, from any cause, the water or other liquid may be allowed to escape through the opening *g*, and thus prevented from backing up in the pipe.

The filter above described is principally intended to be placed in the leads which convey water from the roofs of houses and other buildings to cisterns, tanks, and other receptacles, and the object is to prevent leaves and other solid matter from entering the receptacles and contaminating the water. The filter may be placed at any convenient point in the leads where it can be easily reached and cleaned out; but I do not confine myself to this use of the filter, as it may be applied to the inlet-pipe of any liquid-receptacle, or between compartments of a receptacle, or in the outlet-pipe, if desired.

The dotted lines in Fig. 1 show the manner of connecting the inlet and outlet pipes with the leads or other pipes which convey the water or other liquid.

The liquid entering the above-described device is projected against the bottom of the case instead of flowing directly against the filter, as heretofore, whereby the solid matter is deposited on the bottom of the case, out of the way of the flow of water through the filter, which is thus kept from becoming choked or obstructed.

Having thus described my invention, what I claim as new, and desire to secure by Letters Patent, is—

1. As an improvement in filters, in combination with the inlet-pipe B, outlet-pipe C, and strainer D, arranged below the entrance of the outlet-pipe, the detachable branch pipe E, extending from the inlet-pipe down through the strainer D, so as to convey the inflowing water to the bottom of the case, substantially as herein shown and described.

2. In a filter in which the inflowing water is delivered below the filter or strainer and the outflowing water is carried off from above the same, the combination of the overflow-pipe F connecting the upper portion of the filter-case with the delivery-pipe, in the manner substantially as herein shown and described.

JULIUS BERGEMAN.

Witnesses:
JOHN B. CAMPBELL,
JOHN D. JAMES.